United States Patent Office 2,753,374
Patented July 3, 1956

2,753,374

1-BENZYL-3-β-HYDROXYETHYL-2-THIOUREA

Ralph G. D. Moore, Chenango Forks, N. Y., assignor to General Aniline & Film Corporation, New York, N. Y., a corporation of Delaware No Drawing. Application November 23, 1953, Serial No. 393,940

1 Claim. (Cl. 260—552)

The present invention pertains to 1-benzyl-3-β-hydroxyethyl-2-thiourea and to a method of producing the same.

1-benzyl-3-β-hydroxyethyl-2-thiourea is a very interesting compound, due to the fact that it possesses a strong negative group attached to one nitrogen atom of the thiourea system, to wit, the benzyl group, and a very strong basic group, as a consequence of hydroxyethylating the other nitrogen atom. By virtue of this constitution it appears that the compound is capable of undergoing the formation of complex chemical compounds as by reaction with, for example, diazonium compounds as explained in the copending application filed by Sulich and Herrick on even date herewith and entitled "Method of Improving Rate of Ammonia Development of Light Sensitive Diazotype Materials" Serial No. 393,938, filed November 23, 1953. In view of its apparent ability to form complex compounds, the aforementioned copending application recommends the compound as an agent serving to facilitate the rate of development of light sensitive diazotype materials.

1-benzyl-3-β-hydroxyethyl-2-thiourea has the following structural formula:

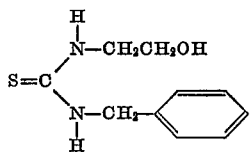

It has been ascertained that this compound can be prepared in good yields by reaction of 2-aminoethanol with benzyl isothiocyanate in an inert diluent. As such diluents I recommend the employment of neutral normally liquid solvents boiling above 60° C., such as, for example, isopropyl alcohol, butyl alcohol, isobutyl alcohol, benzyl alcohol and the like. While the reaction may be effected while utilizing the components in equimolecular amounts, it is preferred to employ an excess of the alkylol amine.

To the alkylol amine, dissolved in the inert diluent, there is added the benzyl isothiocyanate portionwise. The reaction begins at once as a consequence of which the temperature rises to above 60° C. By means of intermittent cooling the temperature is maintained at this point.

The reaction mixture may be worked up by filtering the crystalline slurry obtained, washing with a suitable solvent and drying under reduced pressure.

The following example will serve to illustrate the invention, the parts being by weight unless otherwise stated. It is to be understood, however, that the example is not to be construed as a limitation of the invention.

Example

To a stirred solution of 16.6 grams of 2-aminoethanol in about 40 mls. of isopropyl alcohol, 33.9 grams of benzyl isothiocyanate were added over a period of about 15 minutes. The reaction was immediate, the temperature rising to about 60° C., where it was held by intermittent cooling. About one-half hour after all had been added, the solution was cooled and seeded. The crystalline slurry was filtered after a few hours and the product was washed with cold isopropyl alcohol and dried under reduced pressure. The yield was 18 grams or 31%. The crystals melted at 59.5–61° C. A second crop was obtained by concentration of the filtrate on the steam bath. It melted at 56–58° C. and raised the yield to 50%.

The first crop was found by analysis to contain 13.21% nitrogen, the calculated value for the desired product being 13.35%.

I claim:
1-benzyl-3-β-hydroxyethyl-2-thiourea.

References Cited in the file of this patent

UNITED STATES PATENTS 2,268,324   Polgar _____ Dec. 30, 1941

OTHER REFERENCES

Dains: "JACS," vol. 47 (1925), pp. 1981–89.
Weller et al.: "JACS," vol. 74 (1952), p. 1104.